(12) United States Patent
Faccin

(10) Patent No.: US 9,369,538 B2
(45) Date of Patent: Jun. 14, 2016

(54) ROAMING QUERIES PRIOR TO ASSOCIATION/AUTHENTICATION

(75) Inventor: Stefano Faccin, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 703 days.

(21) Appl. No.: 11/650,445

(22) Filed: Jan. 8, 2007

(65) Prior Publication Data

US 2007/0243888 A1 Oct. 18, 2007

Related U.S. Application Data

(60) Provisional application No. 60/758,548, filed on Jan. 13, 2006.

(51) Int. Cl.
| | |
|---|---|
| *H04W 4/00* | (2009.01) |
| *H04L 29/08* | (2006.01) |
| *H04W 48/14* | (2009.01) |
| *H04W 48/16* | (2009.01) |
| *H04W 36/00* | (2009.01) |
| *H04W 48/08* | (2009.01) |
| *H04W 80/04* | (2009.01) |
| *H04W 88/08* | (2009.01) |

(52) U.S. Cl.
CPC ............ *H04L 67/2819* (2013.01); *H04L 67/04* (2013.01); *H04L 67/28* (2013.01); *H04L 67/2861* (2013.01); *H04W 48/14* (2013.01); *H04W 48/16* (2013.01); *H04W 36/0005* (2013.01); *H04W 36/0011* (2013.01); *H04W 48/08* (2013.01); *H04W 80/04* (2013.01); *H04W 88/08* (2013.01); *Y02B 60/50* (2013.01)

(58) Field of Classification Search
CPC .............................................. H04W 4/00–4/02
USPC .............. 455/461, 423–425, 436–445, 412.1, 455/412.2, 414.1–414.4, 432.1, 434, 455/435.1–435.3; 370/310.2, 328, 338, 331
See application file for complete search history.

(56) References Cited

U.S. PATENT DOCUMENTS

| 5,805,997 | A  | * | 9/1998  | Farris ............................ 455/461 |
| 6,003,082 | A  |   | 12/1999 | Gampper et al. |
| 6,055,564 | A  | * | 4/2000  | Phaal ............................ 709/207 |
| 6,256,301 | B1 | * | 7/2001  | Tiedemann et al. .......... 370/342 |
| 6,505,191 | B1 | * | 1/2003  | Baclawski ........................ 707/3 |

(Continued)

FOREIGN PATENT DOCUMENTS

| JP | 11-265279 A | 9/1999 |
| JP | 11282804 A  | 10/1999 |

(Continued)

OTHER PUBLICATIONS

International Search Report, PCT/IB2007/000064, Filed Sep. 1, 2007.

(Continued)

*Primary Examiner* — San Htun
(74) *Attorney, Agent, or Firm* — Banner & Witcoff, Ltd.

(57) ABSTRACT

A mechanism to enable roaming queries prior to association/authentication while maintaining the advantages of power saving mechanisms can be implemented. The mechanism can involve requiring a mobile terminal to request the desired information a second time so that the access point may take sufficient time to obtain the desired information. The mechanism can be implemented in conjunction with IEEE 802.11.

32 Claims, 4 Drawing Sheets

(56) References Cited

U.S. PATENT DOCUMENTS

| | | | |
|---|---|---|---|
| 6,947,768 B2 * | 9/2005 | Adachi et al. | 455/560 |
| 6,996,083 B1 * | 2/2006 | Balachandran et al. | 370/337 |
| 7,631,043 B2 * | 12/2009 | Burns et al. | 709/206 |
| 2003/0163558 A1 * | 8/2003 | Cao et al. | 709/223 |
| 2003/0221006 A1 * | 11/2003 | Kuan et al. | 709/225 |
| 2004/0209593 A1 | 10/2004 | Alberth, Jr. et al. | |
| 2004/0248557 A1 * | 12/2004 | Muratsu | 455/411 |
| 2005/0047371 A1 | 3/2005 | Bennett | |
| 2005/0059353 A1 | 3/2005 | Smith et al. | |
| 2006/0282882 A1 * | 12/2006 | Bajko et al. | 726/4 |

FOREIGN PATENT DOCUMENTS

| | | |
|---|---|---|
| JP | 2004-363878 A | 12/2004 |
| WO | WO 2004/077245 A2 | 9/2004 |
| WO | 2004/095863 A1 | 11/2004 |
| WO | WO 2005/006785 | 1/2005 |
| WO | 2005048630 A1 | 5/2005 |
| WO | 2005/089249 A2 | 9/2005 |
| WO | WO 2005/081458 A1 | 9/2005 |
| WO | 2007/089111 A1 | 8/2007 |

OTHER PUBLICATIONS

Singapore Search Report, Application No. SG 200804189-9, Date of Mailing: Jun. 25, 2009, pp. 1-7.
Japanese Office Action dated Dec. 27, 2010—Application No. 2008-546827.
Feb. 6, 2015 (EP) Extended European Search Report—App 07700470.3.
Mar. 14, 2016 (in) First Examination Report—App. 2674/CHEN/2008.

* cited by examiner

ROAMING QUERIES PRIOR TO ASSOCIATION/AUTHENTICATION

BACKGROUND OF THE INVENTION

1. Field of the Invention

The present invention relates, for example, to a mechanism for wireless networks such as IEEE 802.11 to enable roaming queries prior to association/authentication while maintaining the advantages of power saving mechanisms.

2. Description of the Related Art

When wireless local area network (WLAN) access points are shared by multiple service providers (e.g. in the case of airport hotspots in which the airport owns the access point, but service is provided by other operators, such as T-Mobile), a technique called "virtual AP" can be used to allow sharing of the access point. From the mobile station's point of view it is as if there were several different access points. Multiple service set identifiers SSIDs can be used by the same access point to support the different service providers.

In traditional roaming cases, the mobile station has a roaming client (e.g. T-Mobile™ connection manager, Boingo™ connection manager, or the like) that has a roaming directory. The roaming directory can be a list of SSIDs for access points to which the station can connect. For a mobile station to select the access point and connect, a valid SSID must be used. Thus, the access point should broadcast that SSID and the mobile station should know it. In other words, currently the burden of determining whether the mobile station can or cannot access a given access point based on a roaming agreement is left completely to the mobile station, and is traditionally solved by downloading a long list of SSIDs to the mobile station.

With current virtual AP solutions, the access point cannot simultaneously broadcast all the SSIDs supported. Therefore, if the mobile station does not detect a supported SSID in the beacons, the mobile station must perform active scanning: it must send a Probe Request to the access point providing a given SSID. If the access point supports it, it will return a positive answer. When roaming, the list of the mobile station preferred SSIDs can be rather long, which can result in extensive signaling to obtain a valid SSID. For example, a mobile station may have 200 SSIDs, which is not an unusual number, and only the 189th may be supported. Thus, in such a circumstance, the mobile station must perform 189 queries. Optimizations have been proposed according to which a list of SSIDs can be provided in beacons and Probe Response messages. However, the list is still limited, and therefore the problem still exists.

Some ideas have been presented to extend the Probe Request and Probe Response frames in such a way that the mobile station can query the network for roaming information or alternatively to define two new management frames to carry the request and the reply. Two options are possible: the mobile station queries for what realms are supported (not realistic, e.g. the list may be very long and therefore the solution does not scale), or the mobile station queries the network using its own Roaming ID and the network replies either yes or no. The second option is more realistic, but has a drawback: the access point may have to retrieve the information from the back end before being able to provide the information to the station, since it is not realistic to expect the access point to be preconfigured with all roaming info. Therefore, the access point may not be able to reply instantaneously to the mobile station request. However, it may be necessary that the Probe Response shall be sent to the mobile station no later than a very short period of time (e.g. 5 ms, as currently defined in the WiFi Alliance) from the receipt of the Probe Request. This requirement may be needed for power saving reasons.

There is the need to allow a mobile station to discover whether it has roaming in a certain access point (AP) without the need for the mobile station to try to authenticate/associate and without requiring continuous probing for different service set identifiers (SSIDs).

Another scenario in which improvement may be required may be in the support of wireless information services, for example, 802.21 Information Service (IS) in 802.11. The idea is to allow the mobile station to access IS information before authentication/association so that the mobile station can decide whether or not it wants to connect. Support of wireless information services such as 802.21 Information Service may require that Probe Request and Probe Response information carry the queries and replies, such as 802.21 IS queries and replies. Solutions are needed to enable this function, since the queries are typically not processed by the access point but by an information server, such as an 802.21 server in the network, and therefore the reply may not be available within a very short period of time from the receipt of the Probe Request.

It may also be important to be able to identify services that are available from an access point before attachment, specifically for information defined in wireless network information services standards, such as IEEE 802.21 Information Service.

SUMMARY OF THE INVENTION

The present invention provides, for example, a method in which an access point receives a query from a station for some information, the access point identifies whether it has the information desired and informs the station that the station needs to re-request to obtain the information.

The present invention also provides, for example, a method in which an access point receives a query from a station carrying a request and data for information service such as 802.21 Information Service (IS), the access point identifies whether it has the information desired and informs the station that the station needs to re-request to obtain the reply to the 802.21 IS request.

The present invention also provides, for example, an apparatus that can be used as an access point. The apparatus includes means for receiving a request for information from a station. The apparatus also include means for processing the request to determine whether the information desired is present in the apparatus. The apparatus further includes means for informing the station that the station needs to re-request in order to obtain the information.

In informing the station of the need to re-request, a query identifier can be included that can enable the station to re-request without having to repeat the details of the request. Additionally, in informing the station of the need to re-request, a time delay value can be provided to indicate to the station how long to wait before requesting the information again.

The request can be either a repeated request, or it may be a new request. Thus, the first request and the re-request may be two different kinds of messages.

The present invention can provide, for example, a terminal including a transmitter and a receiver. The terminal may be configured to prepare a first request message regarding information desired from an access point, transmit the first request message to the access point, receive from the access point a first response message requesting the terminal to come back, wait a predetermined amount of time, transmit to the access point a second response message regarding the information desired responsive to the first probe response, and receive a second probe response from the access point providing the information desired.

The present invention additionally provides, for example, an access point including a transmitter and a receiver. The access point is configured to receive from a terminal a first probe request regarding information desired, transmit to the terminal a first probe response requesting the terminal to come back, obtain the information desired from a backend, receive a second probe request regarding the information desired responsive to the first probe response, and transmit a second probe response from the access point providing the information desired.

BRIEF DESCRIPTION OF THE DRAWINGS

In the following, the present invention will be described in greater detail based on preferred embodiments with reference to the accompanying drawings in which.

DESCRIPTION OF THE PREFERRED EMBODIMENTS

The preferred embodiments will now be described with regard to an example embodiment that includes an access point. The access point may be configured to be shared by multiple networks, and may be able to support IEEE 802.21 Information Service.

Certain embodiments of the present invention can enable an access point receiving a query from a mobile station for some information elements to reply to the mobile station with an indication that the access point can provide the information requested but that the access point cannot provide it right away. This may occur when the access point does not have the information requested at the moment the request is received and the access point is unable to retrieve the information in real-time. Certain embodiments of the invention enable such an access point to indicate to the mobile station that the mobile station needs to query again for the information. This indication may be referred to as a "come back" indication.

The access point may optionally return a query identifier (QueryID) to be used by the terminal to query the access point again without the need for indicating again the information elements required. The value of the query identifier may be unique for the access point. Thus, when more than one information element (IE) is requested and is not available instantaneously at the access point, the query can be easily referenced in a subsequent query without the need to repeatedly detail the information desired. Thus, radio resources may be conserved.

The access point may also optionally return a time value (ComeBackDelay) determined by the access point and indicating how long the terminal ought to wait before querying the access point again.

The Probe Request/Response messages can be extended by adding new information elements. A mobile station can specify in a probe request what information elements it is requesting. In a probe response the mobile station can get the requested information if supported by the access point. Some 'fixed' information elements may always be present.

Figure 1:
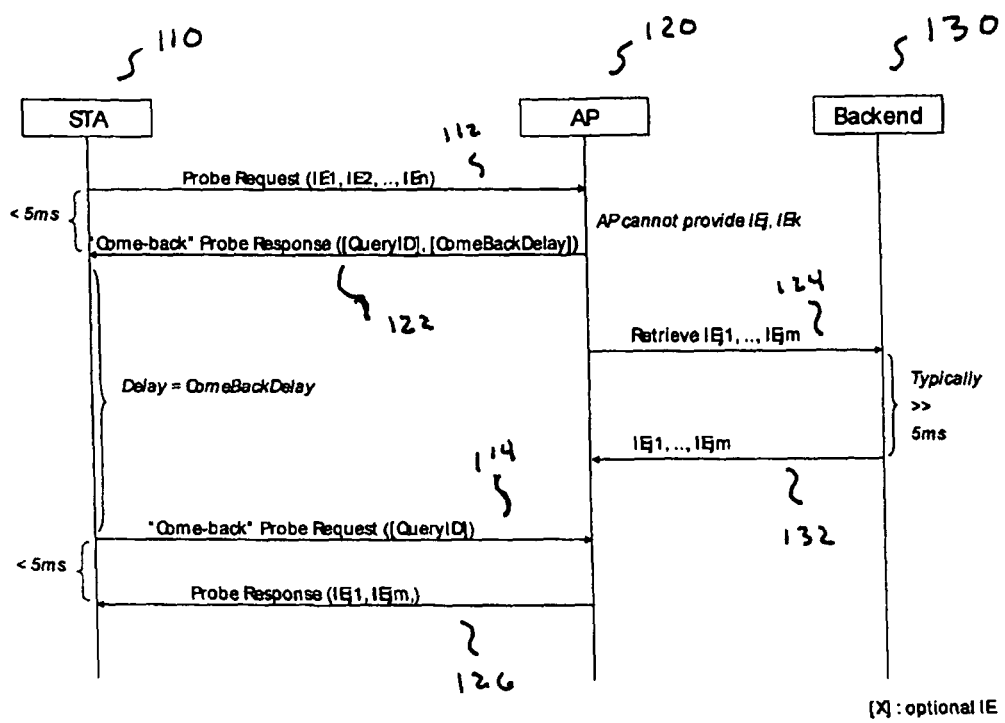
FIG. 1 illustrates a signal flow diagram according to an embodiment of the present invention.

FIG. 1 depicts a flow according to an embodiment of the present invention. The mobile station 110 may send a Probe Request 112 extended to contain a list of IEs (IE1, 1E2, IEn) that are being requested. The access point 120 may determine that it cannot return IEji, IEjm immediately, or that it cannot immediately provide a reply to the mobile station query. This latter situation may occur if, for example, the mobile station 110 has provided a RoamingID. The access point 120 returns in a "come-back" Probe Response 122 the list of info requested minus IEji, IEjm. The access point 120 may optionally provide the mobile station 110 with a QueryID. The QueryID can serve as a ticket that references the original query in the form of Probe Request 112, and which can be used to reduce the length of a second request from the mobile station 110. The access point 120 may also optionally provide a ComeBackDelay parameter indicating how long the mobile station 110 should wait before sending a "come-back" Probe Request 114, which may be a second request for the same information in order to obtain the missing information.

The mobile station 110 may wait for a certain amount of time and send a "come-back" Probe Request 114 optionally containing the QueryID to relate the new query to the previous query. The amount of time may be the amount of time indicated by ComeBackDelay, an amount determined by the mobile station 110, or a predetermined amount of time. The access point 120 may then return IEji, IEjm in a Probe Response 126. If the mobile station 110 does not re-query by sending the come-back Probe Request 114, the access point 120 may delete the information after a certain amount of time to avoid a denial of service (DoS) attack on the access point 120 resulting from the generation of a multitude of queries in order to consume access point memory.

Meanwhile, while the mobile station 110 is waiting to re-request, the access point 120 may obtain IEji, IEjm from a backend 130, by means of a retrieval request 124. The backend 130 may process the retrieval request 124 and return IEji, IEjm to the access point 120 in a data message 132. The time between the retrieval request 124 and the data message 132 may typically be much greater than 5 ms.

The mobile station 110 does not need to remain active while waiting to send the "come-back" Probe Request 126, therefore it can save power, as opposed to having to stay active—waiting for an answer to its original Probe Request 112. Because the mobile station 110 re-requests the information, the timing of the re-request can be at the convenience of the mobile station 110.

If a mobile station is connected to a first access point (APi) and is actively exchanging data frames with APi, but wants to retrieve information from a target access point (AP2), the mobile station does not need to remain on the AP2 channel while waiting to send the "come-back" Probe Request. As with an inactive mobile station, the mobile station can come back to the AP2 channel when an appropriate amount of time has elapsed. Thus, unnecessary processing within the mobile station can be avoided.

The access point may retrieve the information using a protocol like Control And Provisioning of Wireless Access Points (CAPWAP) or Authentication, Authorization, and Accounting (AAA).

The Probe Request can be extended with the Roaming ID provided in a NAI Request Information Element. The Probe Request can also be extended to support a variety of IEs to support information service, such as 802.21 Information Service (IEs can be those defined in 802.21 specifications). The Probe Request can be further extended to support a QueryID field.

Similarly, the Probe Response can be extended to support a variety of IEs to support 802.21 Information Service (IEs can be those defined in 802.21 specifications). The Probe Response can be extended to support a QueryID field. The Probe Response can also be extended to support a ComeBackDelay field.

Certain security considerations should be borne in mind. If the access point stores the results of a query for a given mobile station only until the mobile station sends the "come-back" query, a hacker who intercepts the "come-back" response from the access point to a legitimate mobile station could send a new request to the access point before the legitimate mobile station and cause the access point to purge the information retrieved for the mobile station. Thus, the mobile station/access point would fail on the come-back query because the information is no longer available at the access point. One way to reduce the risk of this attack is for the access point to store the mobile station MAC address. However, a hacker may be able to spoof the mobile station MAC address because the mobile station is not yet authenticated/associated with the access point. Solutions are being introduced to stop MAC hijacking/spoofing in wireless networks such as IEEE 802.11 networks, but they will likely apply only to authenticated/associated mobile stations. Additionally, certain implementations may allow a mobile station to use a well known or random MAC address to send/receive Probe Request/Response messages, thereby preventing a network from tracking a roaming mobile station that performs active scanning (i.e. probing).

Thus, storing the MAC address of the mobile station associated with a query in the access point would not entirely eliminate the security concern discussed here. A simpler mechanism is for the access point to cache the result of the query for a time that is predicted to be slightly longer than the time necessary for the mobile station to send the come-back query.

The present invention may advantageously enable current power saving mechanisms. For example, the mobile station does not need to remain active while waiting to send the "come-back" Probe Request, therefore enabling power saving. Also, if the mobile station is connected to a first access point (AP1) and is actively exchanging data frames with AP1, but wants to retrieve information from a target access point (AP2), the mobile station does not need to remain on the AP2 channel while waiting to send the "come-back" Probe Request. Additionally, certain embodiments of the invention do not require the access point to use more memory than it would if it were configured to have all the information available. In fact, the access point can store the result of the query in a generic way so that other queries may be returned the same information (if relevant). Thus, the access point may maintain a cache of frequently requested information, thereby reducing the number of times that a come-back must occur.

Certain embodiments of the present invention can enable an access point receiving a query from a mobile station for some information elements, the access point not having the information requested at the moment the request is received, and the access point being configured to retrieve the information in real-time, to reply to the mobile station with an indication that the access point is able to provide the information requested but that the access point cannot provide it right away. Also, certain embodiments of the present invention can enable the access point to indicate the terminal that the terminal needs to query again for the information.

The access point may optionally return a query identifier QueryID (whose value is unique for the access point) to be used by the terminal to query the access point again without the need for indicating again the information elements required (this may be useful when more than one information element IE is requested and is not available instantaneously at the access point, and performing a new query by providing again the list of IEs would imply a waste of radio resources). The access point may optionally return also a time value ComeBackDelay determined by the access point and indicating how long the terminal shall wait before querying the access point again.

Figure 2:
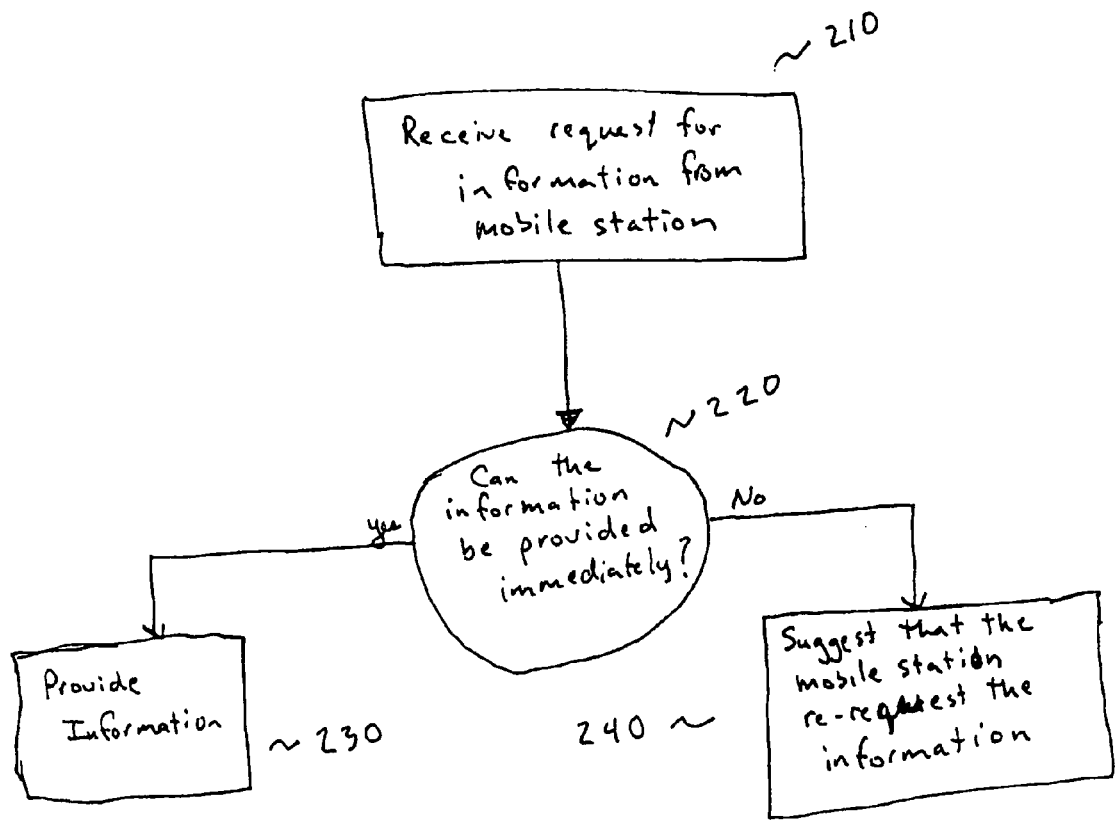
FIG. 2 illustrates a processing flow diagram of an access point according to an embodiment of the present invention.

As shown in FIG. 2, an access point may receive 210 a request for information from a mobile station. The access point may then decide 220 whether the information can be provided immediately. If it can, the access point may provide 230 the information. Otherwise, the access point may suggest 240 that the mobile station re-request the information at a later time.

As explained above, when the access point suggests 240 that the mobile station re-request the information at a later time, the access point may provide a query ID to help simplify the re-request and a delay value or window that may enable the mobile station to send the re-request at an expedient time.

Figure 3:
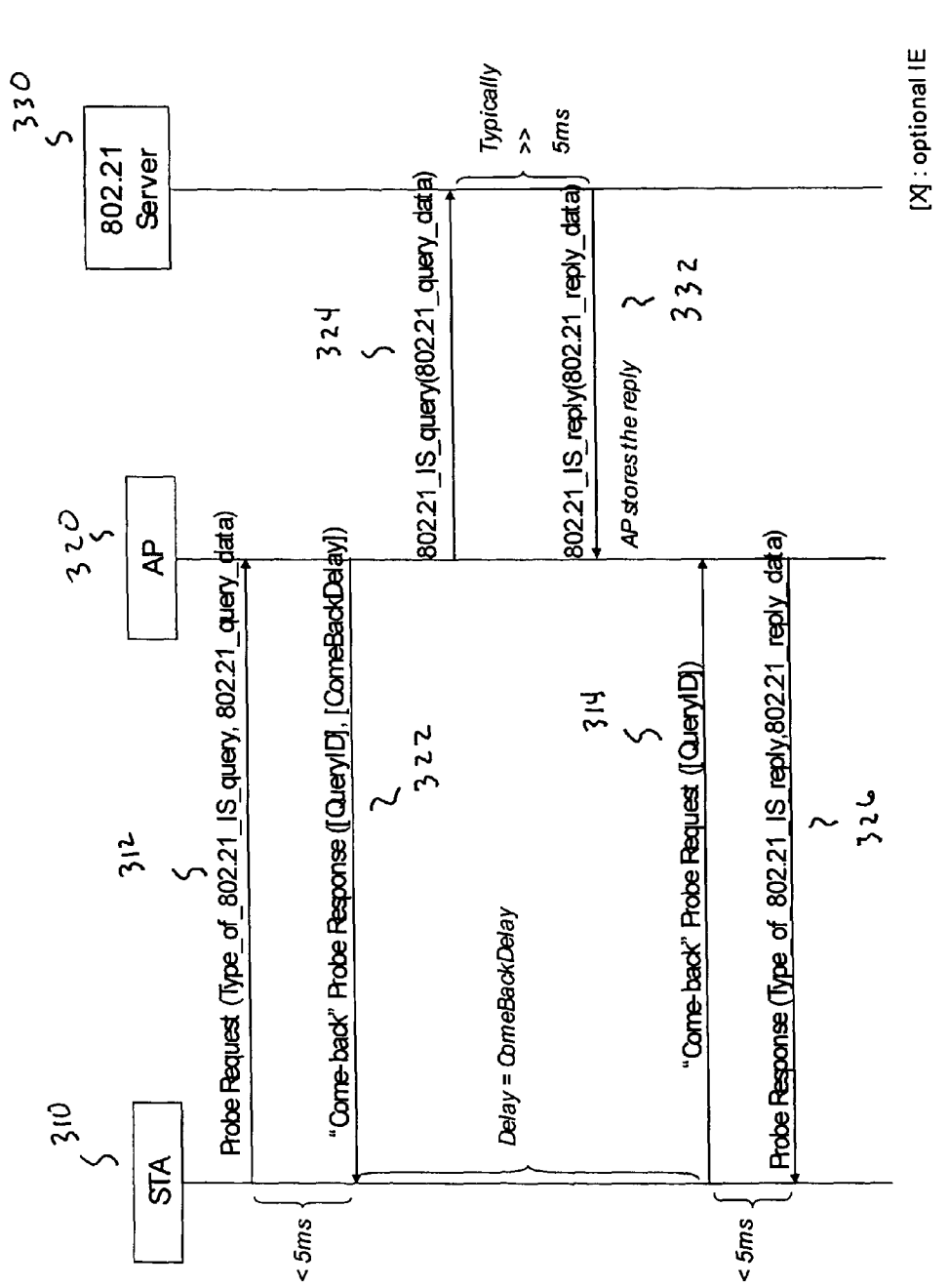
FIG. 3 illustrates a signal flow diagram in which the access point refers to an 802.21 information server to retrieve the requested information.

As shown in FIG. 3, the mobile station may send a probe request to the access point requesting data. The access point may return a come-back probe response to the mobile station, providing a query ID and a come back delay. The query ID may uniquely identify the query with a serial number. The query ID may be used by the mobile station to reference the original query. The come back delay may specify a delay in seconds or fractions thereof that the mobile station should wait before requesting the data again. During the delay, while the mobile station is waiting to request the data again, the access point may query an information server such as an 802.21 information server for the data. The information server may reply with the data, but may take significantly longer than 5 msec to reply. The delay may be designed to account for the length of time that it is expected that the information server will take to reply. After the delay has completed, the mobile station sends a come-back probe request to the access point. The come-back probe request may simply identify the previous request using the query ID provided by the access point. The access point can then respond with the desired information.

FIG. 3 illustrates an embodiment of the present invention including an information server such as an 802.21 information server 330. The mobile station 310 may send a Probe Request 312 including Type_of_802.21_IS_query and 802.21_query_data. The access point 320 may determine that it cannot return the requested data immediately and return in a "come-back" Probe Response 322 optionally including a QueryID and a ComeBackDelay. The determining and return the come-back Probe Response 322 may occur within an approximately 5 ms window.

The mobile station 310 may wait for a certain amount of time, which may correspond to the ComeBackDelay information, and may send a "come-back" Probe Request 314 optionally containing the QueryID to relate the new query to the previous query. The access point 320 may then return Type_of_802.21_IS_reply and 802.21_reply_data in a Probe Response 326.

Meanwhile, while the mobile station 310 is waiting during the ComeBackDelay time, the access point 320 may submit 802.21_query_data in an 802.21_IS_query 324 to an 802.21

Server 130. The 802.21 Server 330 may process the 802.21_IS_query 324 and return 802.21_reply_data in an 802.21_IS_reply 332 to the access point 320. The time between the 802.21_IS_query 324 and the 802.21_IS_reply 332 may typically be much greater than 5 ms.

Figure 4:
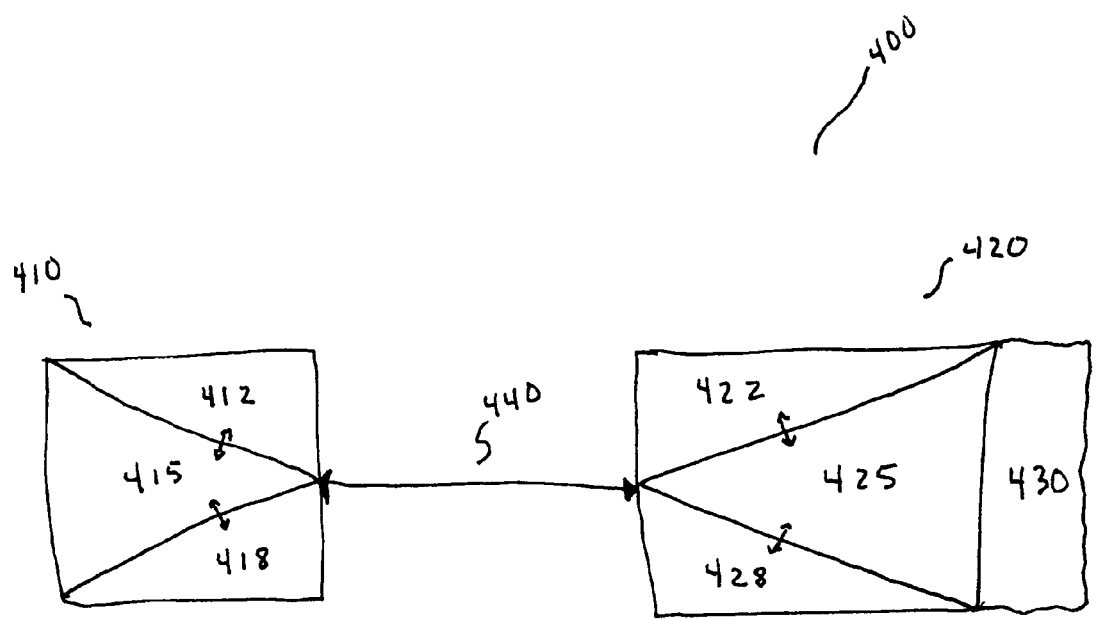
FIG. 4 illustrates a simplified block diagram of a communication system according to an embodiment of the present invention.

FIG. 4 shows an embodiment of a communication system 400 according to an embodiment of the present invention. As illustrated a mobile station 410 may be able to communicate with an access point 420 over a communication medium 440, which may, for example, be a wireless connection through air or space.

The mobile station 410 may include a transmitter 412 configured to send probe requests, a receiver 418 configured to receive probe responses and a processor 415. The processor 415 may be configured for a variety of tasks such as generating the probe requests, analyzing the probe responses, and controlling the receiver 412 and transmitter 418. The processor 415 may be implemented in hardware, software or some combination thereof, and may include a general purpose computer, an application specific integrated circuit (ASIC) or other hardware.

The access point 420 may include a transmitter 422 configured to send probe responses, a receiver 428 configured to receive probe requests and a processor 425. The processor 425 may be configured for a variety of tasks such as generating the probe responses, analyzing the probe requests, and controlling the receiver 422 and transmitter 428. The processor 425 may be implemented in hardware, software or some combination thereof, and may include a general purpose computer, an application specific integrated circuit (ASIC) or other hardware.

The access point 420 may also be equipped with a backend 430. Although the backend 430 is shown attached to the access point 420, there is no requirement that the backend 430 be physically connected to the access point 420, and so the backend, which also may include a similar circuitry to the processors 415 and 425, may be located at the convenience of the implementer of the system.

The backend 430 may have various components and capabilities. For example, the backend 430 may include an informational database to assist the access point 420. The backend 430 may also be configured to communicate with the access point 420 and respond to queries from the access point 420.

Although the invention is described with regard to request messages that are probe requests and response messages that are probe responses, it should be noted that other management frames could be used in place of the probe requests and probe responses. Such management frames can include management frames that do not carry user data. Accordingly, the invention is not limited to the particular form of the messages used.

It is noted that the present invention is not restricted to the above preferred embodiments but can be variously modified as would be apparent to one of ordinary skill in the art.

Thus, one having ordinary skill in the art will readily understand that the invention as discussed above may be practiced with steps in a different order, and/or with hardware elements in configurations that are different than those that are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the claims.

What is claimed is:

1. An apparatus, comprising:
   at least one memory including computer program code, and
   at least one processor,
   wherein the computer program code, when executed by the at least one processor, causes the apparatus to at least:
   prepare a first request message that comprises information specifying one or more information elements that are being requested from an access point;
   transmit the first request message to the access point; and
   receive from the access point a first response message in response to the first request message, the first response message indicating whether the first response message comprises the one or more information elements or a re-request indication, wherein the first response message comprises a come-back delay field that defines a predetermined amount of time for the apparatus to wait after receiving the first response message before transmitting the second request message; and
   if the first response message comprises the re-request indication:
      determine that the first response message comprises a query identifier associated with the one or more information elements;
      prepare a second request message that comprises the query identifier but not the information specifying the one or more information elements;
      transmit the second request message to the access point after waiting the predetermined amount of time; and
      receive a second response message from the access point providing the one or more information elements.

2. The apparatus of claim 1, wherein the first response message indicates whether the first response message comprises the one or more information elements or the re-request indication by comprising a list of information elements that does not include the one or more information elements, and
   wherein the computer program code, when executed by the at least one processor, further causes the apparatus to:
   wait the predetermined amount of time before sending the second request message if the first response message comprises the re-request indication.

3. The apparatus of claim 1, wherein the computer program code, when executed by the at least one processor, further causes the apparatus to transmit management frames as the first request message and the second request message and to receive management frames as the first response message and the second response message.

4. The apparatus of claim 1, wherein the computer program code, when executed by the at least one processor, further causes the apparatus to transmit probe requests as the first request message and the second request message and to receive probe responses as the first response message and the second response message.

5. The apparatus of claim 1, wherein the computer program code, when executed by the at least one processor, further causes the apparatus to place the apparatus in a sleep mode between receiving the first response message and sending the second request message.

6. An apparatus, comprising:
   at least one memory including computer program code, and
   at least one processor,
   wherein the computer program code, when executed by the at least one processor, causes the apparatus to at least:

receive from a terminal a first request message that comprises information specifying one or more information elements that are being requested from an access point;

analyze the first request message and prepare a first response message that indicates whether the first response message comprises the one or more information elements or a re-request indication and comprises a query identifier associated with the one or more information elements, wherein the first response message comprises a come-back delay field that defines a predetermined amount of time for the terminal to wait after receiving the first response message before transmitting the second request message;

transmit to the terminal the first response message, obtain the one or more information elements;

receive a second request message that comprises the query identifier but not the information specifying the one or more information elements;

analyze the second request message and prepare a second response message providing the one or more information elements; and transmit the second response message to the terminal.

7. The apparatus of claim 6, wherein the first response message indicates whether the first response message comprises the one or more information elements or the re-request indication by comprising a list of information elements that does not include the one or more information elements.

8. The apparatus of claim 6, wherein the computer program code, when executed by the at least one processor, further causes the apparatus to determine, before transmitting the first response message, whether the one or more information elements can be provided substantially immediately.

9. The apparatus of claim 6, wherein the computer program code, when executed by the at least one processor, further causes the apparatus to identify the one or more information elements by reference to the query identifier in the second request message.

10. The apparatus of claim 6, wherein the computer program code, when executed by the at least one processor, further causes the apparatus to receive management frames as the first request message and the second request message and to transmit management frames as the first response message and the second response message.

11. The apparatus of claim 6, wherein the computer program code, when executed by the at least open processor, further causes the apparatus to receive probe requests as the first request message and the second request message and to transmit probe responses as the first response message and the second response message.

12. The apparatus of claim 6, wherein the computer program code, when executed by the at least one processor, further causes the apparatus to obtain the one or more information elements from a remote information server.

13. An apparatus, comprising:

transmission means for transmitting a first request message that comprises information specifying one or more information elements that are being requested from an access point;

reception means for receiving from the access point a first response message indicating whether the first response message comprises the one or more information elements or a re-request indication, wherein the first response message comprises a come-back delay field that defines a predetermined amount of time for the apparatus to wait after receiving the first response message before transmitting the second request message; and wait means for waiting the predetermined amount of time if the first response message comprises the re-request indication, determining means for determining that the first response message comprises a query identifier associated with the one or more information elements;

wherein the transmission means is further configured for transmitting to the access point a second request message after waiting the predetermined amount of time, wherein the second request message comprising the query identifier but not the information specifying the one or more information elements, and wherein the reception means is further configured for receiving a second response message from the access point providing the one or more information elements.

14. An apparatus, comprising:

reception means for receiving from a terminal a first request message that comprises information specifying one or more information elements that are being requested from an access point;

transmission means for transmitting to the terminal a first response message that indicates whether the first response message comprises the one or more information elements or a re-request indication and comprises a query identifier associated with the one or more information elements, wherein the first response message comprises a come-back delay field that defines a predetermined amount of time for the terminal to wait after receiving the first response message before transmitting the second request message; and processing means for obtaining the one or more information elements, wherein the reception means is further configured for receiving a second request message that comprises the query identifier but not the information specifying the one or more information elements, and wherein the transmission means is further configured for transmitting a second response message from the apparatus providing the one or more information elements.

15. A method comprising:

sending, by a terminal and to an access point, a first request message that comprises information specifying one or more information elements that are being requested from an access point;

receiving, by the terminal and from the access point, a first response message that indicates whether the first response message comprises the one or more information elements or a re-request indication and that comprises a query identifier associated with the one or more information elements, wherein the first response message comprises a come-back delay field that defines a predetermined amount of time for the terminal to wait after receiving the first response message before transmitting the second request message;

sending, by the terminal and to the access point, a second request message after waiting the predetermined amount of time, wherein the second request message comprises the query identifier but not the information specifying the one or more information elements; and receiving, by the terminal, from the access point a second response message providing the one or more information elements.

16. The method of claim 15, wherein the first response message indicates whether the first response message comprises the one or more information elements or the re-request indication by comprising a list of information elements that does not include the one or more information elements.

17. The method of claim 16, further comprising:
controlling the terminal to wait the predetermined amount of time before sending the second request message.

18. The method of claim 15, further comprising:
transmitting management frames as the first request message and the second request message; and
receiving management frames as the first response message and the second response message.

19. The method of claim 15, further comprising:
transmitting probe requests as the first request message and the second request message; and
receiving probe responses as the first response message and the second response message.

20. The method of claim 15, further comprising:
placing the terminal in a sleep mode between receiving the first response message and sending the second request message.

21. A method, comprising:
receiving, from a terminal, a first request message that comprises information specifying one or more information elements that are being requested from an access point;
analyzing the first request message and preparing a first response message that indicates whether the first response message comprises the one or more information elements or a re-request indication and that comprises a query identifier associated with the one or more information elements, wherein the first response message comprises a come-back delay field that defines a predetermined amount of time for the terminal to wait after receiving the first response message before transmitting the second request message;
transmitting, to the terminal, the first response message;
obtaining the one or more information elements;
receiving a second request message that comprises the query identifier but not the information specifying the one or more information elements;
analyzing the second request message and preparing a second response message providing the one or more information elements; and
transmitting the second response message to the terminal from the access point.

22. The method of claim 21, further comprising:
determining, before transmitting the first response message, whether the one or more information elements can be provided substantially immediately.

23. The method of claim 21, further comprising:
identifying the one or more information elements by reference to the query identifier in the second request message.

24. The method of claim 21, further comprising:
receiving management frames as the first request message and the second request message; and
transmitting management frames as the first response message and the second response message.

25. The method of claim 21, further comprising:
receiving probe requests as the first request message and the second request message; and
transmitting probe responses as the first response message and the second response message.

26. The method of claim 21, wherein obtaining the one or more information elements comprises:
obtaining the one or more information elements from a remote information server.

27. The apparatus of claim 1, wherein the query identifier represents a reference to the first request message, and wherein the first response message comprises additional information specifying one or more additional information elements that are being requested from the access point.

28. The apparatus of claim 6, wherein the query identifier represents a reference to the first request message, and wherein analyzing the second request message comprises using the query identifier to identify the first request message.

29. The apparatus of claim 13, wherein the query identifier represents a reference to the first request message, and wherein the first response message comprises additional information specifying one or more additional information elements that are being requested from the access point.

30. The apparatus of claim 14, wherein the query identifier represents a reference to the first request message, and wherein the first response message comprises additional information specifying one or more additional information elements that are being requested from the access point.

31. The method of claim 15, wherein the query identifier represents a reference to the first request message, and wherein the first response message comprises additional information specifying one or more additional information elements that are being requested from the access point.

32. The method of claim 21, wherein the query identifier represents a reference to the first request message, and wherein analyzing the second request message comprises using the query identifier to identify the first request message.

* * * * *